United States Patent
Komatsu et al.

(10) Patent No.: US 6,795,276 B2
(45) Date of Patent: Sep. 21, 2004

(54) FLEXIBLE DISK DRIVE HAVING A SUPPORT PLATE COUPLED TO A PEDESTAL ON THE MAIN PLATE BY A PLURALITY OF PROJECTIONS AND A SCREW

(75) Inventors: Hisateru Komatsu, Tendo (JP); Makoto Takahashi, Obanazawa (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 122 days.

(21) Appl. No.: 10/218,162

(22) Filed: Aug. 13, 2002

(65) Prior Publication Data

US 2003/0039057 A1 Feb. 27, 2003

(30) Foreign Application Priority Data

Aug. 21, 2001 (JP) ........................................ 2001-250619

(51) Int. Cl.⁷ ................................................ G11B 5/55
(52) U.S. Cl. .................................................... 360/267.7
(58) Field of Search .............................. 360/267–267.8

(56) References Cited

U.S. PATENT DOCUMENTS 4,875,120 A * 10/1989 Takahashi et al. ....... 360/267.7

FOREIGN PATENT DOCUMENTS

JP 2001-216704 A 8/2001

* cited by examiner

*Primary Examiner*—A. J. Heinz
(74) *Attorney, Agent, or Firm*—Frishauf, Holtz, Goodman & Chick, P.C.

(57) ABSTRACT

A stepping motor in a thin-sized flexible disk drive is disposed on a pedestal portion in such a manner as to be spaced apart from a main wall of a main plate. The pedestal portion is made of a pedestal and a support metal member. The pedestal is formed by projecting a part of the main plate from a back-surface side thereof to an obverse-surface side thereof. A support plate is screwed to the pedestal to support the stepping motor and to rotatably support the extending end of the rotating shaft of the stepping motor. The pedestal is provided with a plurality of positioning projections formed to project from an obverse-surface side thereof, and a screwing hole for screwing the support metal member. The support metal member is provided with holes formed at positions respectively corresponding to the plurality of projections and the screwing hole.

5 Claims, 18 Drawing Sheets

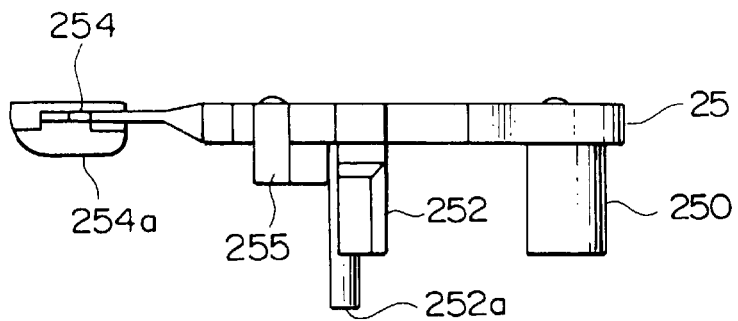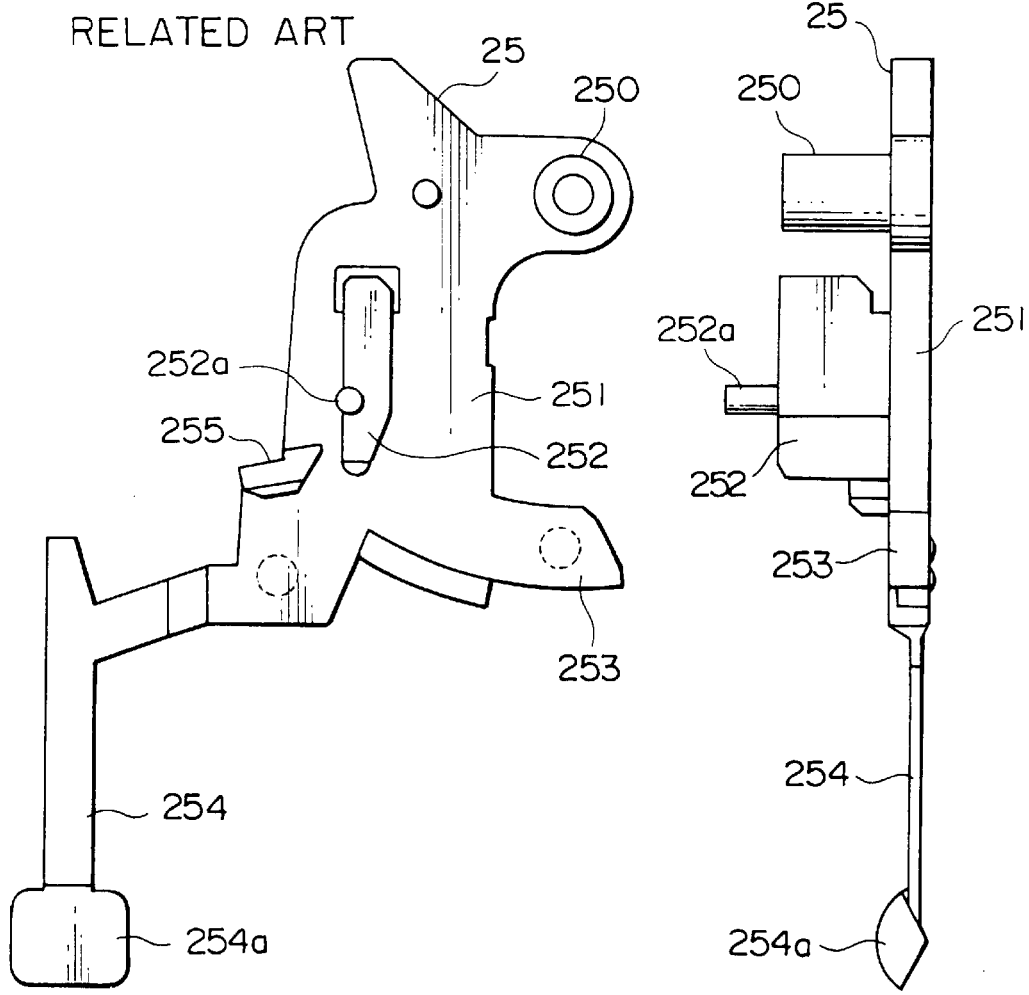
FIG. 9C RELATED ART
FIG. 9A RELATED ART
FIG. 9B RELATED ART

FLEXIBLE DISK DRIVE HAVING A SUPPORT PLATE COUPLED TO A PEDESTAL ON THE MAIN PLATE BY A PLURALITY OF PROJECTIONS AND A SCREW

BACKGROUND OF THE INVENTION

1. Field of the Invention

The present invention relates to an improvement for realizing a reduction in the required number of component parts of a flexible disk drive for a flexible disk.

2. Background Art

As is well known, a flexible disk drive is a device for recording and reproducing data on and from a disk-shaped magnetic recording medium of a flexible disk. The flexible disk drive is mounted in a portable electronic apparatus such as a laptop personal computer, a notebook-type personal computer or a notebook-type word processor.

In recent years, with a more reduction in the thickness of such a portable electronic apparatus, the thickness of a flexible disk drive to be built or mounted in the portable electronic apparatus is being reduced more and more.

A thin-sized flexible disk drive (Japanese Patent Laid-Open No. 2001-216704) proposed by the present inventors will be described below with reference to FIGS. 1 to 14. The shown thin-sized flexible disk drive is a 3.5-inch flexible disk drive for a 3.5-inch flexible disk. FIG. 1 is a plan view showing the state in which a flexible disk is being inserted. FIG. 2 is a plan view showing the state in which the flexible disk is completely loaded. FIGS. 1 and 2 show a state in which a top cover (not shown) is removed.

A flexible disk 40 is inserted into the flexible disk drive from the direction indicated by an arrow A in each of FIGS. 1 and 2. The inserted flexible disk 40 is held on a disk table (not shown) with a rotating shaft thereof coinciding with the central axis of the flexible disk 40. The disk table is rotatably supported on the obverse surface of a motor plate (not shown) secured to a main plate 13. Accordingly, the axial direction of the rotating shaft of the disk table (the direction perpendicular to FIG. 1 or 2) is parallel to the thickness direction of the main plate 13. The disk table is rotationally driven by a spindle motor provided on the motor plate, whereby a magnetic recording medium of the flexible disk 40 is rotated. A circuit board (not shown) on which a multiplicity of electronic components are mounted is secured to the obverse surfaces of the main plate 13 and the motor plate.

The flexible disk drive is provided with a pair of upper and lower magnetic heads for recording and reproducing data on and from the magnetic recording medium of the flexible disk 40. Although the pair of upper and lower magnetic heads is made of an upper magnetic head 14 and a lower magnetic head, FIGS. 1 and 2 show only the upper magnetic head 14. The pair of the upper and lower magnetic heads is supported by an extending end of a carriage assembly 15 provided on a back side of the flexible disk drive. Namely, the carriage assembly 15 has an upper carriage which supports the upper magnetic head 14 and a lower carriage which supports the lower magnetic head. In the following description, the pair of the upper and lower magnetic heads is also collectively called the magnetic head 14. As will be described later, the carriage assembly 15 is disposed apart from the main plate 13 on the obverse-surface side of the main plate 13. The carriage assembly 15 supports the magnetic head 14 for movement relative to the flexible disk along a predetermined radial direction thereof (the direction indicated by a double-headed arrow B in each of FIGS. 1 and 2).

A stepping motor 16 is fixed to a side wall 131 of the main plate 13 on the back side thereof. The stepping motor 16 linearly drives the carriage assembly 15 along the predetermined radial direction B. More specifically, the stepping motor 16 has a rotating shaft (driving shaft) 161 which extends in parallel with the predetermined radial direction B. The rotating shaft 161 is externally threaded. An extending end of the rotating shaft 161 is inserted through an open opened in a pedestal portion 132 secured to the obverse surface of the main plate 13. Namely, the rotating shaft 161 is restricted in such a manner as to extend in parallel with the predetermined radial direction B, and the extending end of the rotating shaft 161 is rotatably held.

The carriage assembly 15 has an arm 151 which extends from the lower carriage to the rotating shaft 161. The extending end of the arm 151 is engaged with a root portion of the external thread of the rotating shaft 161. Accordingly, as the rotating shaft 161 rotates, the extending end of the arm 151 is made to move along the root portion of the external thread of the rotating shaft 161. In this manner, the carriage assembly 15 travels along the predetermined radial direction B. Namely, the stepping motor 16 serves as a drive source for causing the carriage assembly 15 to travel linearly along the predetermined radial direction B.

The rotating shaft 161 is provided on one of opposite sides of the carriage assembly 15, and the arm 151 is engaged with the rotating shaft 161. Accordingly, the one of the opposite sides of the carriage assembly 15 is movably supported in the state of being spaced apart from the main plate 13, by the rotating shaft 161. However, the entire carriage assembly 15 cannot be disposed apart from the obverse surface of the main plate 13 by only the support of the rotating shaft 161. For this reason, the carriage assembly 15 is guided with the other of the opposite sides of the carriage assembly 15 supported by a guide bar 17. Specifically, the guide bar 17 is provided on the side of the carriage assembly 15 opposite to the rotating shaft 161. The guide bar 17 extends in parallel with the predetermined radial direction B. The opposite ends of the guide bar 17 are fixed on the obverse-surface side of the main plate 13, and the carriage assembly 15 is guided along the predetermined radial direction B. In this manner, the entire carriage assembly 15 is disposed apart from the obverse surface of the main plate 13.

Incidentally, a flexible printed circuit (hereinafter abbreviated to FPC) which is not shown extends from the carriage assembly 15 to the guide bar 17. The FPC is electrically connected to the circuit board secured to the obverse surface of the main plate 13.

FIG. 3 is a plan view of the main plate 13. FIG. 4 is a left side view of the main plate 13. The guide bar 17 (FIG. 1) is clamped by a guide bar clamp (not shown) on the obverse-surface side of the main plate 13. The guide bar clamp is fixed at its opposite ends to the obverse surface of the main plate 13 by binding machine screws.

The guide bar clamp merely clamps the guide bar 17, and the guide bar 17 cannot be fixed to the obverse-surface side of the main plate 13 by only the guide bar clamp. For this reason, a pair of positioning members for restricting the positions of the opposite ends of the guide bar 17 is needed. As such a pair of positioning members, a pair of bent portions 201 and 202 is used which is formed by forming cut portions of the main plate 13 and raising the cut portions on the obverse-surface side of the main plate 13.

Referring back to FIGS. 1 and 2, the lower carriage of the carriage assembly 15 also serves as a support frame which supports the carriage assembly 15 for sliding movement along the guide bar 17. The lower carriage has a projecting portion (not shown) which projects toward the guide bar 17. The guide bar 17 is slidably fitted into this projecting portion.

The flexible disk drive further has an ejecting plate 21, a disk holder 22 and a subplate 23 which constitute a disk loading/ejecting mechanism. The main plate 13, the ejecting plate 21, and the disk holder 22 are formed by applying punching, press working, bending or the like to a metal plate.

The ejecting plate 21 is provided on the main plate 13 for sliding movement in an inserting direction A of the flexible disk 40 and in the opposite direction, that is, in the forward and backward directions.

FIGS. 5 and 6 are left side views of the flexible disk drive shown in FIGS. 1 and 2. FIG. 5 shows the state in which the flexible disk 40 is not inserted. FIG. 6 corresponds to FIG. 2, and shows the state in which the flexible disk 40 is loaded.

The ejecting plate 21 has a pair of side walls 210 formed to be opposed to each other. A pair of cam portions 211 is formed in each of the pair of side walls 210. A stopper portion (which will be described later) is provided on the bottom surface of the ejecting plate 21. The stopper portion is engaged with an engagement portion of an ejecting lever which will be described later.

FIG. 7 is a plan view of the disk holder 22, and FIG. 8 is a left side view of the disk holder 22. The disk holder 22 is disposed under the ejecting plate 21. The disk holder 22 has a main wall 220. A pair of side walls 221 opposed to each other are respectively formed on opposite ends of the main wall 220. Each of the pair of side walls 221 is provided with a pair of pins 222 and 223. The pins 222 and 223 of each of the side walls 221 are respectively inserted into the pair of cam portions 211 formed in the corresponding one of the pair of side walls 210 of the ejecting plate 21.

An approximately rectangular opening 224 which extends in the predetermined radial direction B is provided at a position which corresponds to the upper carriage of the carriage assembly 15 in the central portion of the back-surface side of the disk holder 22. An approximately U-shaped raised peripheral portion 225 which is raised from the main wall 220 of the disk holder 22 around the opening 224 is formed to surround the opening 224.

The upper carriage of the carriage assembly 15 is provided with a pair of side arms 153 (refer to FIGS. 1 and 2) which extend sideways. The pair of side arms 153 is positioned above the raised peripheral portion 225. As will be described later, when the flexible disk 40 is in the state of being ejected from the disk holder 22, the pair of side arms 153 is engaged with the raised peripheral portion 225. Accordingly, the pair of the upper and lower magnetic heads which constitute the magnetic head 14 are separated from each other.

The disk holder 22 further has, on the right side of the opening 224, an opening 226 having a shape which allows the turning of a lever portion of the ejecting lever which will be described later.

As shown in FIGS. 1 and 2, the obverse-surface side of the main plate 13 is covered with the subplate 23. The subplate 23 is fixed to the main plate 13 at its four corners by screws 231. Ejecting springs 24 are disposed between the subplate 23 and the ejecting plate 21.

As shown in FIGS. 5 and 6, pin-restricting pieces 232 which are formed by perpendicular bending in such a manner as to be extended downward are provided on the opposite sides of the subplate 23, respectively. A downwardly linear pin-restricting slot 232a is formed in each of the pin-restricting pieces 232. The pins 222 are respectively inserted into the pin-restricting slot 232a. Owing to this construction, the position of the disk holder 22 in the inserting direction A with respect to the main plate 13 is determined, and the disk holder 22 is capable of moving back and forth (upward and backward) along the axial direction of the rotating shaft of the disk table.

As shown in FIGS. 1 and 2, an ejecting lever 25 is turnably provided in the vicinity of the carriage assembly 15.

FIGS. 9A to 9C show the structure of the ejecting lever 25. FIG. 9A is a plan view of the ejecting lever 25, FIG. 9B is a right side view of the ejecting lever 25, and FIG. 9C is a rear view of the ejecting lever 25. An upwardly extending rod-shaped pin (not shown) is provided at a predetermined position 133 (FIG. 3) on the back side of the main plate 13. The ejecting lever 25 has a cylindrical portion 250 in which the rod-shaped pin is to be inserted, an arm portion (lever portion) 251 which extends in a radial direction from the cylindrical portion 250, a projecting portion 252 which is provided on the arm portion 251 and extends upward, and an arcuated engagement portion 253 which extends in a circumferential direction from a free end of the arm portion 251. The ejecting lever 25 has an ejecting lever spring (not shown) fitted on the cylindrical portion 250. The ejecting lever spring urges the ejecting lever 25 counterclockwise as viewed in FIG. 9A.

The projecting portion 252 of the ejecting lever 25 engages with the leading edge of the flexible disk 40, and controls the forward/backward sliding movement of the ejecting plate 21.

The ejecting lever 25 further has a tongue portion 254 which extends toward the spindle motor in parallel with the arm portion 251. An end portion 254a of the tongue portion 254 is raised. The end portion 254a causes the flexible disk 40 to avoid colliding with the lower magnetic head when the flexible disk 40 is being inserted into the flexible disk drive.

As shown in FIG. 3, bent portions 134, 135 and 136 are formed on the obverse-surface side of the main plate 13 by forming cut portions in the main plate 13 and raising the cut portions on the obverse-surface side of the main plate 13. The counterclockwise turn of the ejecting lever 25 is restricted by these bent portions 134 to 136. In addition, the tongue portion 254 is disposed under the bent portion 136 so that the tongue portion 254 is prevented from separating from the obverse surface of the main plate 13.

The projecting portion 252 of the ejecting lever 25 further has an upward projecting projection 252a. The projection 252a engages with a hook portion of a disk shutter arm which will be described later.

The ejecting lever 25 further has a stopper portion 255. When the flexible disk 40 is completely loaded in the flexible disk drive, the stopper portion 255 engages with a disk shutter arm 26 (which will be described later) and prevents the disk shutter arm 26 from returning to its initial position.

Referring to FIG. 10 as well as FIG. 7, the disk shutter arm 26 is secured for turning movement about an arm pin 260 at a corner portion 227 of the disk holder 22 on the back side thereof. The disk shutter arm 26 has an arm portion (lever portion) 261 which extends in a radial direction from the corner portion 227 and an arm bush 262 which is provided at an extending end of the arm portion 261 and extends downward therefrom.

FIGS. 11A and 11B show the construction of the arm portion 261, and FIGS. 12A to 12D show the construction of the arm bush 262. FIG. 11A is a plan view of the arm portion 261, and FIG. 11B is a front view of the arm portion 261. FIG. 12A is a front view of the arm bush 262, FIG. 12B is a bottom view of the arm bush 262, FIG. 12C is a rear view of the arm bush 262, and FIG. 12D is a front view of the arm bush 262.

The arm portion 261 has a hook portion 261a which engages with the projection 252a of the ejecting lever 25.

As shown in FIG. 10, the arm bush 262 is movably fitted in the opening 226 of the disk holder 22. An extending end 262a of the arm bush 262 engages with a right edge portion of a shutter of the flexible disk and controls the opening and closing of the shutter. The arm bush 262 further has a projecting portion 262b. When the flexible disk 40 is completely loaded in the flexible disk drive, the projecting portion 262b engages with the stopper portion 255 of the ejecting lever 25 as described above.

The disk shutter arm 26 is urged counter clockwise by a shutter arm spring 263. Specifically, the shutter arm spring 263 is disposed between the arm portion 261 of the disk shutter arm 26 and the disk holder 22. An upper magnetic head guard 32 is secured to the raised peripheral portion 225 of the disk holder 22. A reverse insertion preventing spring (not shown) is secured to the right side of the main wall 220 of the disk holder 22. The combination of the disk holder 22, the disk shutter arm 26, the arm pin 260, the upper magnetic head guard 32, the reverse insertion preventing spring and the disk shutter arm 26 constitutes a disk holder assembly.

Returning to FIGS. 1 and 2, a front panel 27 is secured to the front end of the main plate 13. The front panel 27 is provided with an opening (not shown) through which to insert and eject the flexible disk 40, and a door (not shown) which opens and closes this opening. The front panel 27 has an ejecting button 28 which is projected for movement in the forward and backward directions. The ejecting button 28 is fitted in a projecting portion (not shown) which projects forward from the front end of the ejecting plate 21.

FIG. 13 shows the relationship between a stopper portion 212 provided on the bottom surface of the ejecting plate 21 and the engagement portion 253 of the ejecting lever 25. As shown in FIG. 13, when the flexible disk 40 is not inserted in the flexible disk drive, the stopper portion 212 of the ejecting plate 21 is engaged with the engagement portion 253 of the ejecting lever 25.

In the above-described construction, as shown in FIG. 1, when the flexible disk 40 is not completely inserted in the flexible disk drive, the hook portion 261a of the disk shutter arm 26 is engaged with the projection 252a of the ejecting lever 25 to restrict the turning operation of the ejecting lever 25. Accordingly, so long as the flexible disk 40 is not completely inserted in the flexible disk drive, the ejecting lever 25 can be prevented from turning beyond a predetermined rotational angle. In other words, even if shock is applied to the flexible disk drive, the malfunction of the ejecting lever 25 can be prevented.

The operation of inserting the flexible disk 40 into the flexible disk drive and the operation of ejecting the flexible disk 40 inserted in the flexible disk drive will be described below with reference to FIGS. 1 through 13.

First of all, the operation of inserting the flexible disk 40 will be described. Before the flexible disk 40 is inserted into the flexible disk drive, the projection 252a of the ejecting lever 25 is engaged with the hook portion 261a of the disk shutter arm 26. During this state, as shown in FIG. 13, the stopper portion 212 of the ejecting plate 21 is engaged with the engagement portion 253 of the ejecting lever 25. In addition, during this state, as shown in FIG. 5, the pins 222 and 223 of the disk holder 22 are located at their top positions in the respective cam portions 211 of the ejecting plate 21, and the disk holder 22 is located at its upper position. This position is a position where the flexible disk 40 can be received. Furthermore, during this state, the side arms 153 of the carriage assembly 15 are engaged with the raised peripheral portion 225 of the disk holder 22, and the upper magnetic head is located at a position away from the lower magnetic head.

During this state, while the front edge of the flexible disk 40 is being pressed against the door of the front panel 27, the flexible disk 40 is inserted into the flexible disk drive in a normal state in the inserting direction indicated by the arrow A. Then, as shown in FIG. 1, the top right edge portion of the shutter of the flexible disk 40 engages with the extending end 262a of the arm bush 262 of the disk shutter arm 26. From this point of time (position), the flexible disk 40 is further pressed against the urging force of the shutter arm spring 263 fitted to the disk shutter arm 26. Then, the arm bush 262 of the disk shutter arm 26 turns clockwise within the opening 226, as shown by an arrow D in FIG. 10. In accordance with this movement, the shutter of the flexible disk 40 slides against the urging force of a spring member. Accordingly, as the shutter slides, a magnetic-head inserting opening of the flexible disk 40 is gradually opened.

Immediately before the shutter of the flexible disk 40 is fully opened by the disk shutter arm 26 and the flexible disk 40 is completely loaded in the flexible disk drive, the front edge of the flexible disk 40 engages with the projecting portion 252 of the ejecting lever 25. At this time, since the engagement of the hook portion 261a of the disk shutter arm 26 with the projection 252a of the ejecting lever 25 is released, the ejecting lever 25 is placed in a clockwise turnable state.

When the flexible disk 40 is further pressed into the flexible disk drive, the ejecting lever 25 turns clockwise as shown by an arrow E in FIG. 13 against the ejecting lever spring fitted to the ejecting lever 25, thereby releasing the engagement of the engagement portion 253 of the ejecting lever 25 with the stopper portion 212 of the ejecting plate 21. Accordingly, the ejecting plate 21 slides forward (in the opposite direction to the inserting direction A) to a small extent. This is because the ejecting plate 21 is urged forward by the ejecting springs 24.

In the meantime, as the ejecting plate 21 slides forward, the disk holder 22 moves downward as shown in FIG. 6. This is because the pins 222 and 223 (FIGS. 7 and 8) formed on the side walls 221 of the disk holder 22 are inserted through the cam portions 211 formed in the side walls 210 of the ejecting plate 21.

Thus, the engagement of the side arms 153 of the carriage assembly 15 and the raised peripheral portion 225 of the disk holder 22 is released, and the upper carriage of the carriage assembly 15 moves downward. Accordingly, the magnetic recording medium of the flexible disk 40 is clamped by the magnetic head 14 made of a pair of upper and lower magnetic heads, which is provided at the extending end of the carriage assembly 15. At this time, since the projecting portion 262b of the arm bush 262 of the disk shutter arm 26 engages with the stopper portion 255 of the ejecting lever 25, the disk shutter arm 26 is prevented from returning the initial position. Incidentally, since the ejecting plate 21 slides forward to a small extent, the ejecting button 28 also projects forward from the front panel 27 to a small extent. This state is shown in FIG. 2.

After that, the recording and reproduction of data on and from the magnetic recording medium of the flexible disk 40 can be effected through the magnetic head 14 by a well-known method.

The operation of ejecting the flexible disk 40 loaded in the disk holder 22 will be described below.

In this case, the ejecting button 28 is pressed in the inserting direction A. Owing to this operation, the ejecting plate 21 slides on the main plate 13 backward in the inserting direction A. At the same time, since the pins 222 and 223 of the disk holder 22 travels along the cam portions 211 of the ejecting plate 21, the disk holder 22 moves upward. Accordingly, the side arms 153 of the carriage assembly 15 and the raised peripheral portion 225 of the disk holder 22 engage with one another, and the magnetic head 14 made of a pair of upper and lower magnetic heads, which is supported at the leading end portion of the carriage assembly 15, separates from the magnetic recording medium of the flexible disk 40. When the ejecting button 28 is further pressed in the inserting direction A, the disk holder 22 is placed at a predetermined specified upper position, and the ejecting lever 25 is turned counterclockwise in the opposite direction to the arrow E shown in FIG. 13, by the urging force of the ejecting lever spring.

At the same time, the engagement between the stopper portion 255 of the ejecting lever 25 and the projecting portion 262b of the arm bush 262 of the disk shutter arm 26 is released, and the disk shutter arm 26 is turned counterclockwise in the opposite direction to the arrow D shown in FIG. 10, by the urging force of the shutter arm spring 263. Accordingly, the flexible disk 40 loaded in the disk holder 22 is pressed outward in the opposite direction to the inserting direction A, whereby the flexible disk 40 is ejected from the thin-sized flexible disk drive. During this state, as shown in FIG. 13, since the engagement portion 253 of the ejecting lever 25 engages with the stopper portion 212 of the ejecting plate 21, the ejecting plate 21 is prevented from traveling toward the front panel 27.

Referring to FIGS. 14 and 15, description will be made of a securing structure of the stepping motor 16 in the above-mentioned flexible disk drive. In order to fix and support the stepping motor 16 apart from a main wall of the main plate 13, the pedestal portion 132 is formed in the following manner. At first, openings are formed at two positions of the main plate 13. To the openings, a pair of bushes 132-1 are inserted, respectively. Each of the bushes 132-1 is caulked or staked on the lower surface of the main plate 13 (see FIG. 15) to be fixed to the main plate 13. The bush 132-1 is provided with a tapped portion 132-2 at its center. The pedestal portion 132 (see FIG. 1) is screwed and fixed to the bushes 132-1. The pedestal portion 132 serves to support the body of the stepping motor 16 and to rotatably support an extending end of the rotating shaft 161.

As described above, in order to secure the stepping motor 16, it is required to prepare a pair of the bushes 132-1 having the tapped portions 132-2 and to fix the bushes 132-1 to the main plate 13 by caulking. This results in high production cost due to the increase in number of component parts and in number of assembling steps including the caulking operation.

Furthermore, there is a dimensional tolerance between the diameters of the two openings formed in the main plate 13. In addition, there is another dimensional tolerance between the diameters of the bushes 132-1 and the diameters of the two openings. Therefore, when the bushes 132-1 are caulked, positional error of the bushes 132-1 is often caused. Since the pedestal portion 132 is screwed at two positions, it is difficult to fix the pedestal portion 132 if the bushes 132-1 are fixed at improper positions.

SUMMARY OF THE INVENTION

It is an object of the present invention to provide a thin-sized flexible disk drive which is effective in reducing cost because the required number of component parts associated with a securing structure of a stepping motor can be reduced.

A flexible disk drive according to the present invention includes a main plate, a disk table for rotationally driving a flexible disk while holding the flexible disk, a carriage assembly on which is mounted a magnetic head for recording and reproducing data on and from the flexible disk, the carriage assembly being movable relative to a radial direction of the flexible disk. A stepping motor for driving the carriage assembly is provided on the main plate.

According to an aspect of the present invention, the flexible disk drive further includes a pedestal portion for disposing the stepping motor apart from a main wall of the main plate. The pedestal portion includes a pedestal formed by projecting a part of the main plate from a back-surface side thereof to an obverse-surface side thereof, and a support plate screwed to the pedestal to support the body of the stepping motor and to rotatably support an extending end of a rotating shaft of the stepping motor. The pedestal is provided with a plurality of positioning projections formed to project from an obverse-surface side of the pedestal, and a screwing hole for screwing the support plate. The support plate has holes formed at positions respectively corresponding to the plurality of projections and the screwing hole.

BRIEF DESCRIPTION OF THE DRAWINGS

FIGS. 9A to 9C are views showing the structure of an ejecting lever used in the thin-sized flexible disk drive shown in FIG. 1, FIG. 9A being a plan view, FIG. 9B being a right side view, and FIG. 9C being a rear view;

DESCRIPTION OF THE PREFERRED EMBODIMENTS

Figure 1:
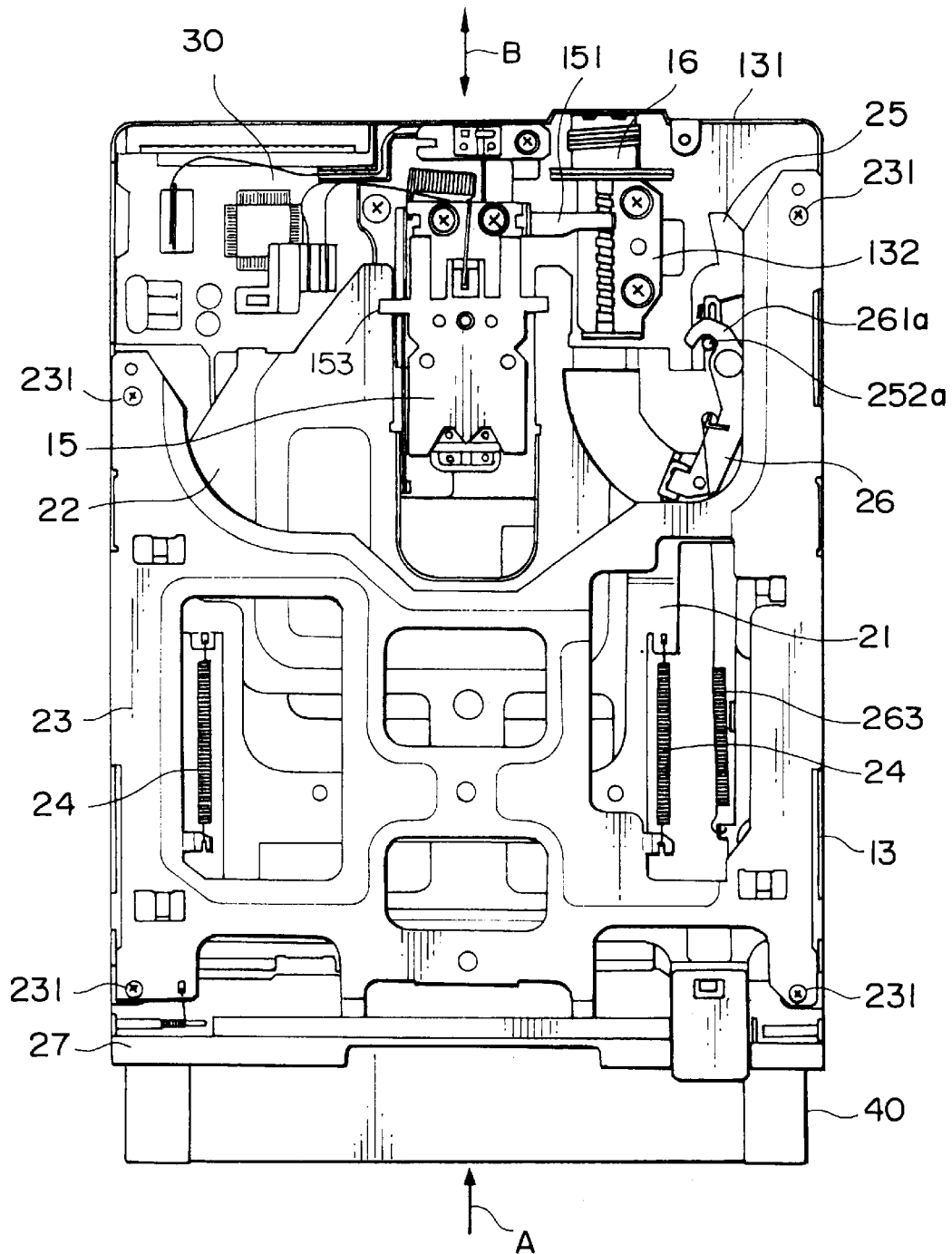
FIG. 1 is a plan view showing the state in which a flexible disk is being inserted into a thin-sized flexible disk drive that is a related art and is proposed by the present inventors.
Figure 2:
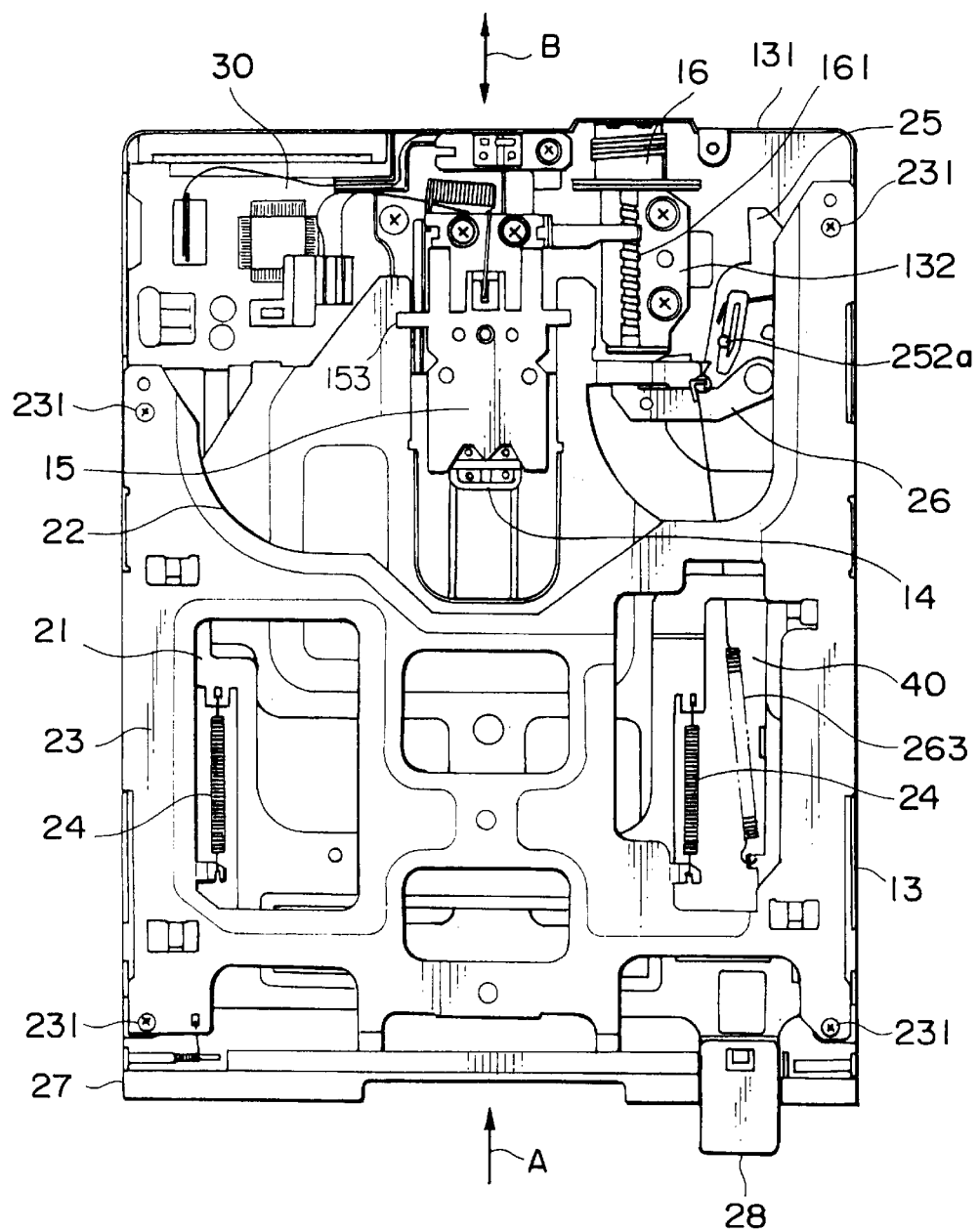
FIG. 2 is a plan view showing the state in which the flexible disk is completely loaded in the thin-sized flexible disk drive shown in FIG. 1.
Figure 3:
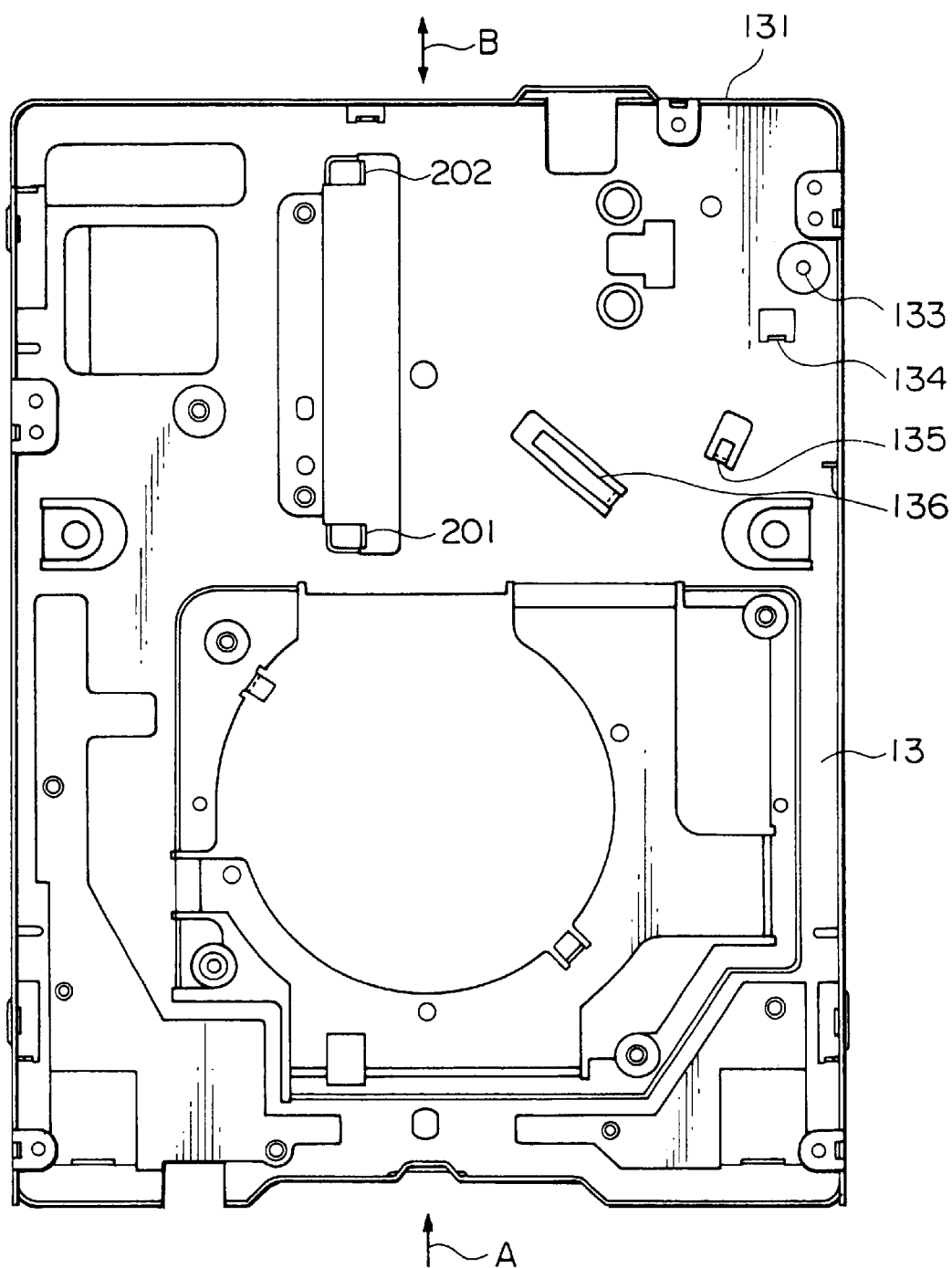
FIG. 3 is a plan view of the construction of a main plate used in the thin-sized flexible disk drive shown in FIG. 1.
Figure 4:
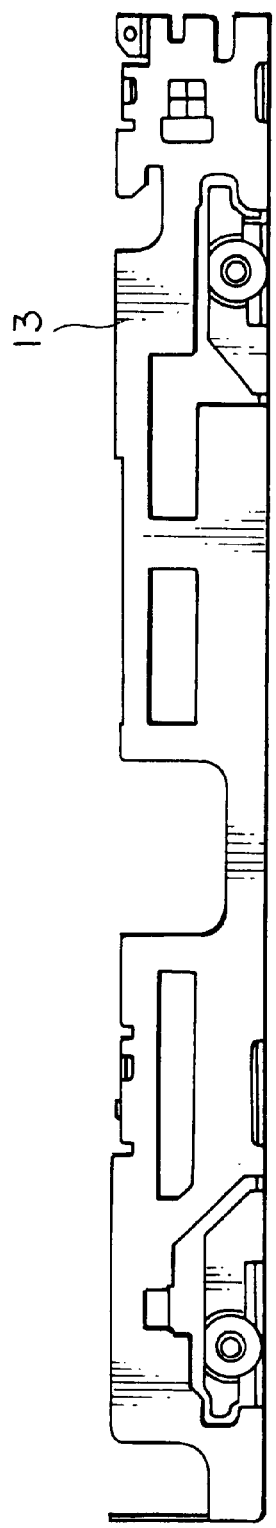
FIG. 4 is a left side view of the main plate shown in FIG. 3.
Figure 5:
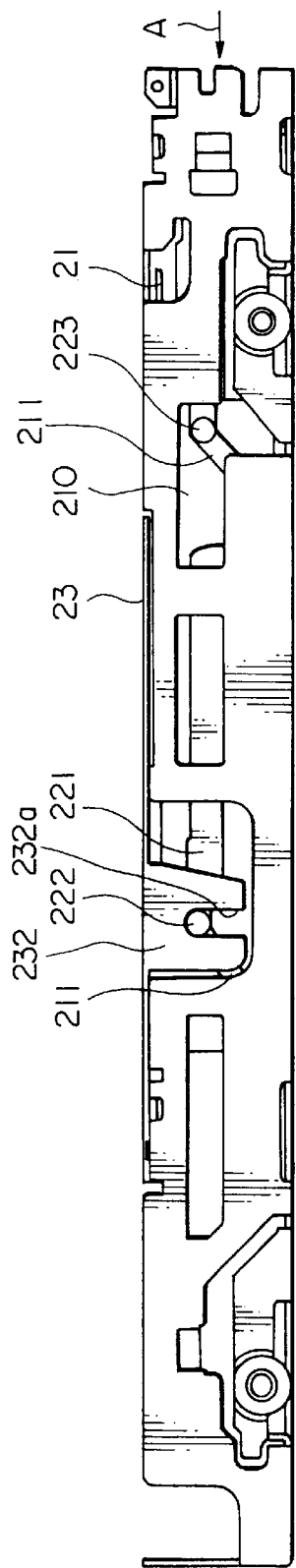
FIG. 5 is a left side view of the thin-sized flexible disk drive shown in FIG. 1.
Figure 6:
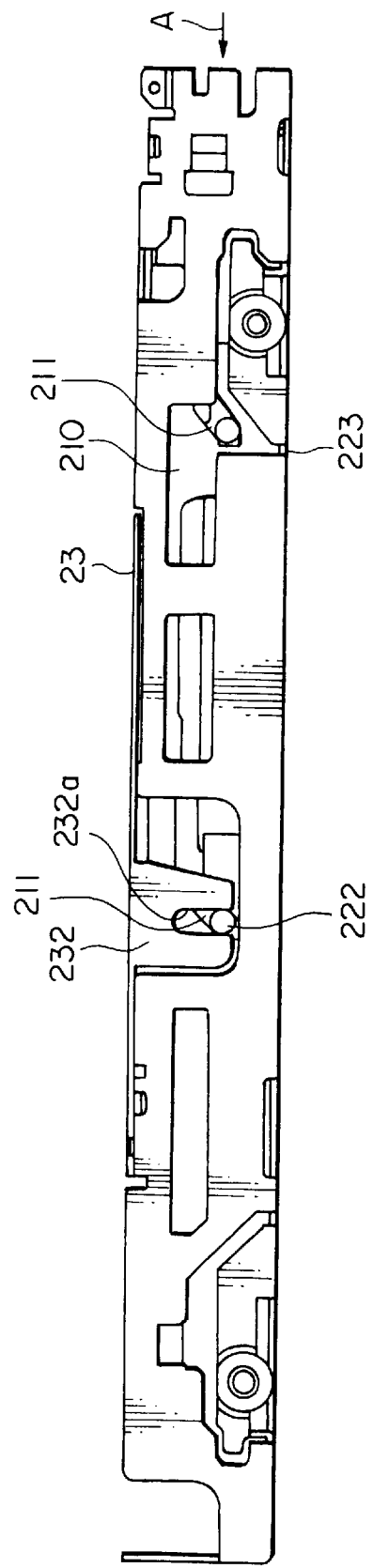
FIG. 6 is a left side view of the thin-sized flexible disk drive shown in FIG. 2.
Figure 7:
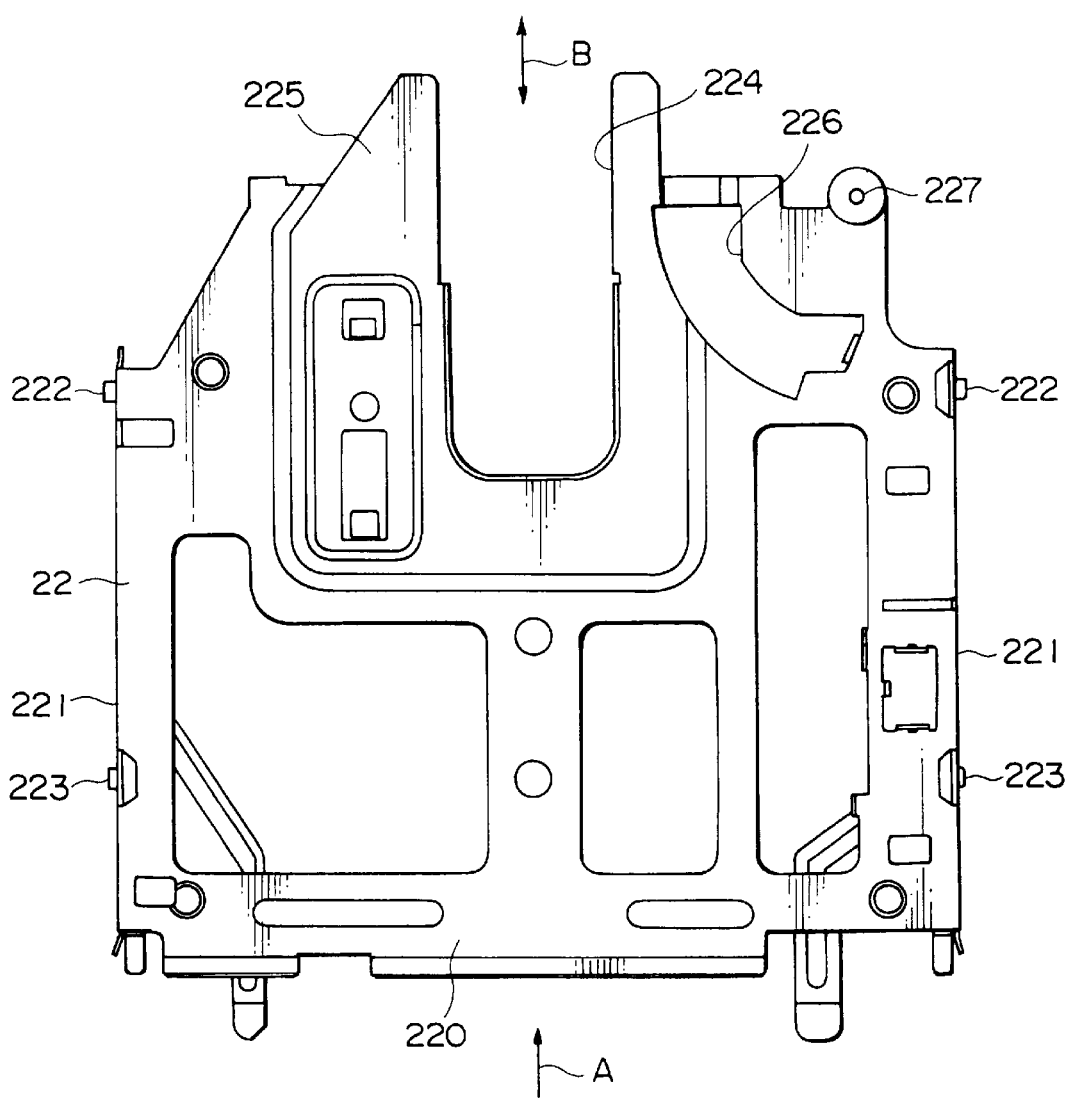
FIG. 7 is a plan view showing the construction of a disk holder used in the thin-sized flexible disk drive shown in FIG. 1.
Figure 8:
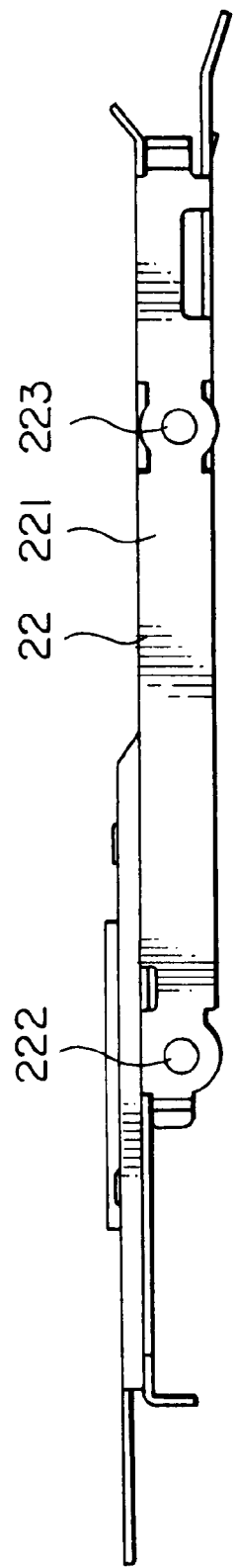
FIG. 8 is a left side view of the main plate shown in FIG. 7.
Figure 10:
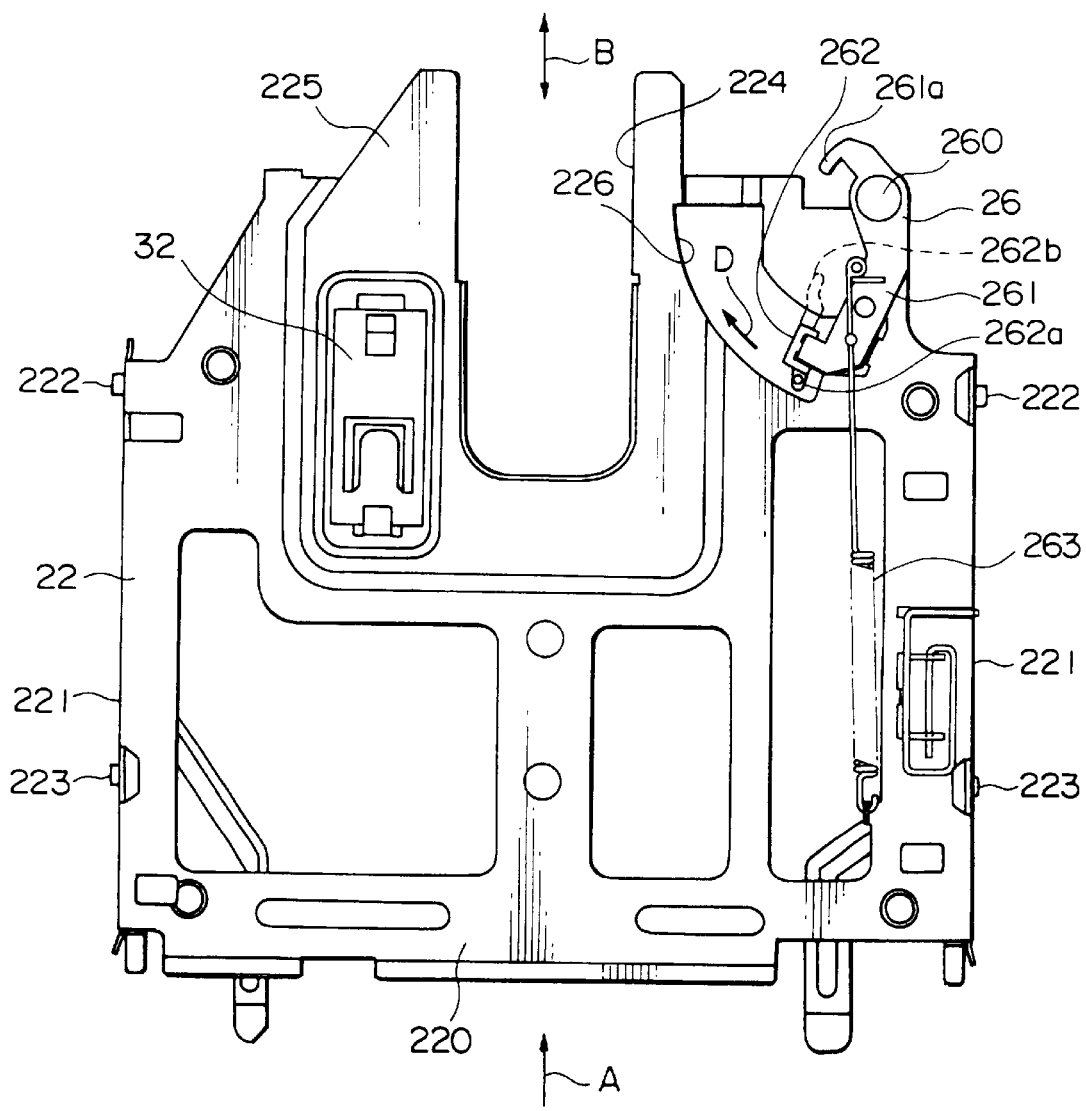
FIG. 10 is a plan view showing the construction of a disk holder assembly used in the thin-sized flexible disk drive shown in FIG. 1.
Figure 11A:
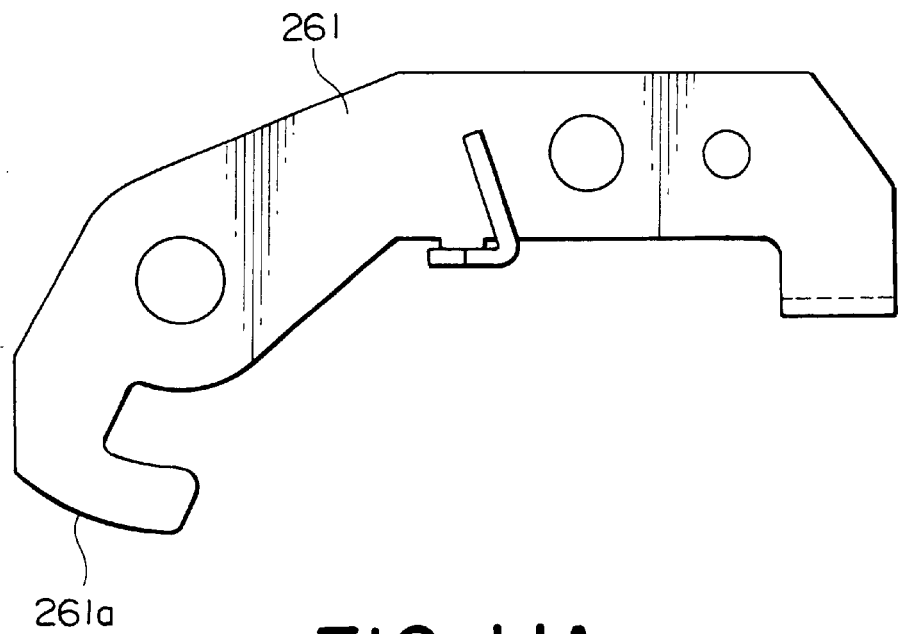
FIGS. 11A and 11B are views showing the construction of an arm portion of a disk shutter arm used in the thin-sized flexible disk drive shown in FIG. 1, FIG. 11A being a plan view and FIG. 11B being a front view.
Figure 11B:
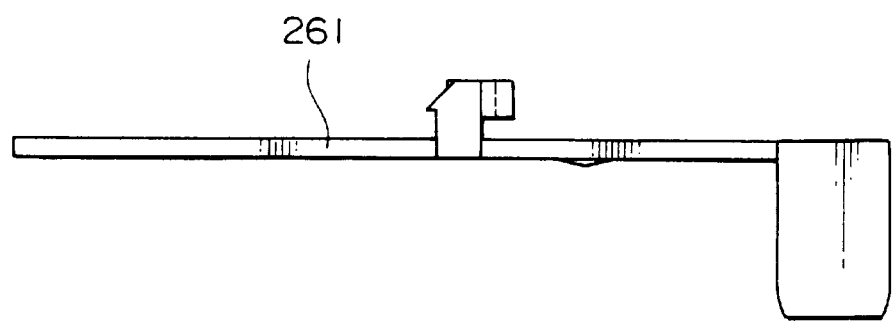
Figure 12A:
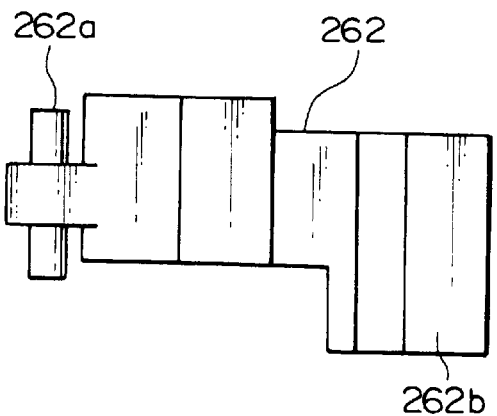
FIGS. 12A to 12D are views showing the construction of an arm bush of the disk shutter arm used in the thin-sized flexible disk drive shown in FIG. 1, FIG. 12A being a front view, FIG. 12B being a bottom view, FIG. 12C being a rear view and FIG. 12D being a plan view.
Figure 12B:
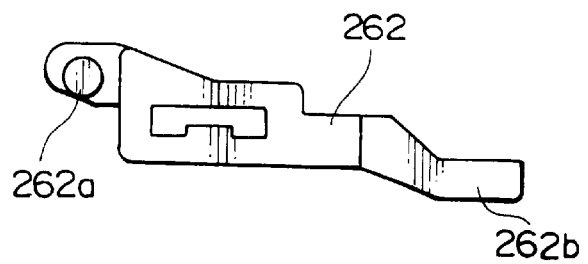
Figure 12C:
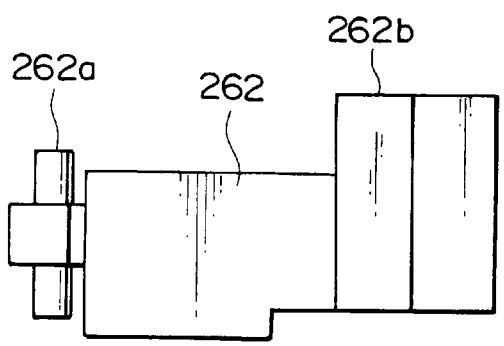
Figure 12D:
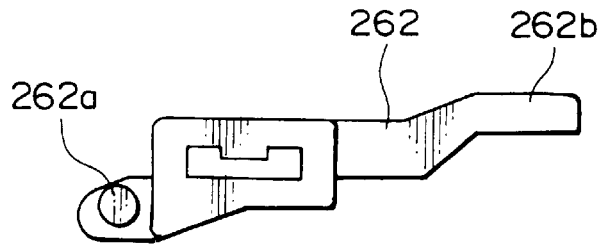
Figure 13:
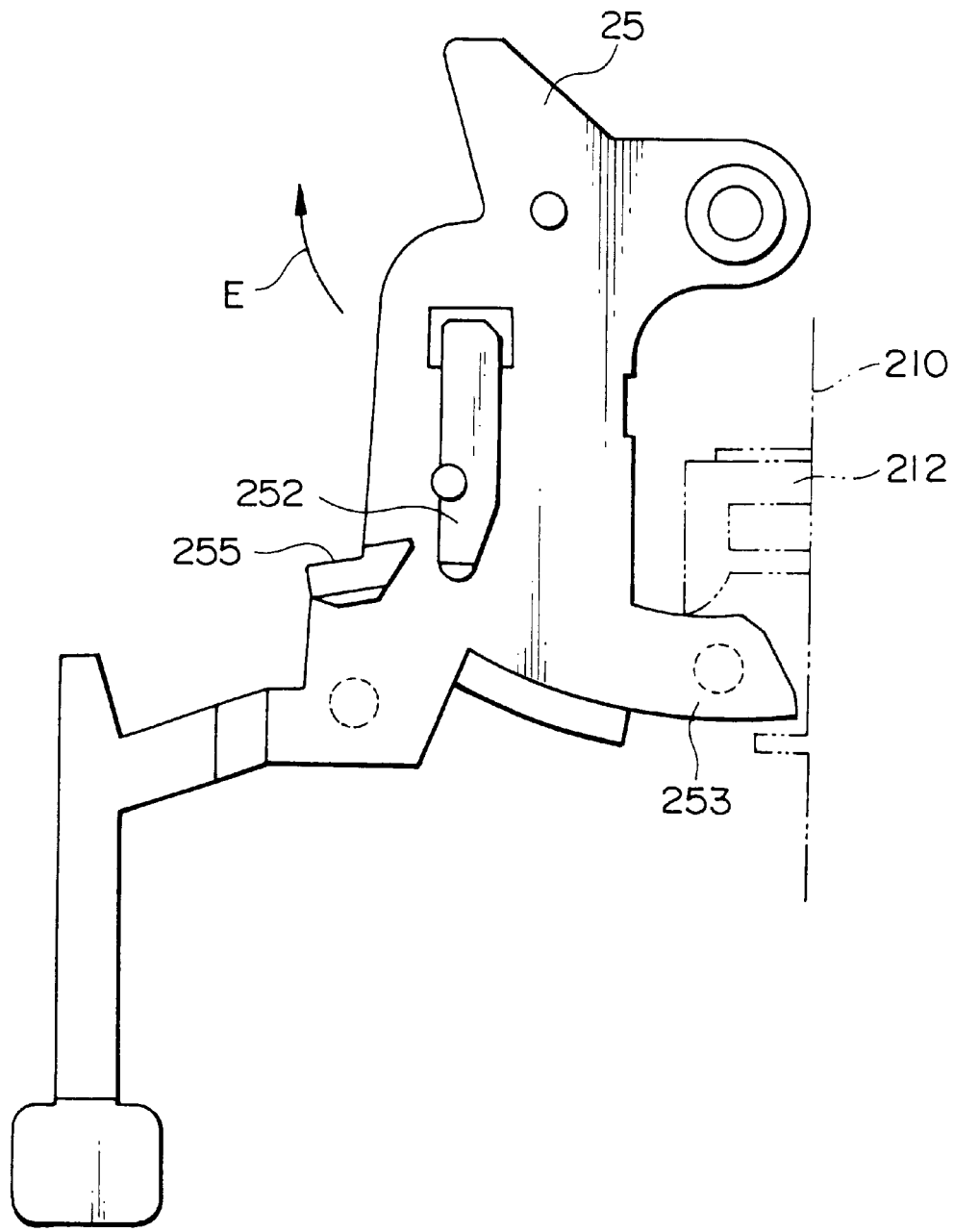
FIG. 13 is a plan view showing the relationship between an engagement portion of the ejecting lever shown in FIGS. 9A to 9C and a stopper portion provided on the bottom surface of an ejecting plate.
Figure 14:
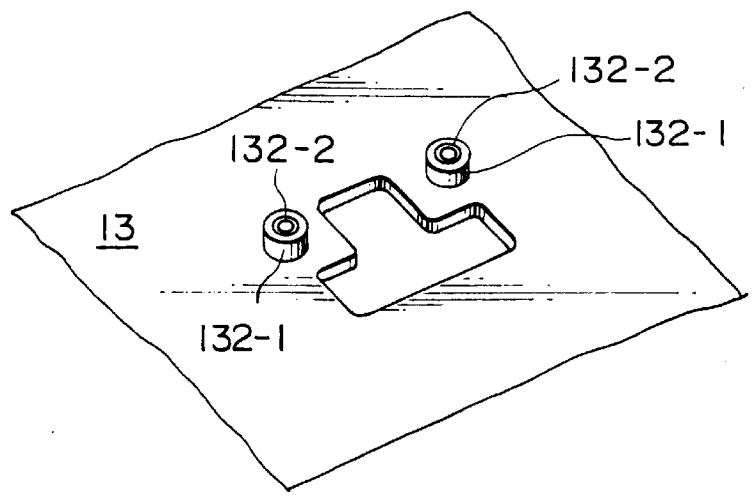
FIG. 14 is a partially perspective view of a securing portion of a stepping motor illustrated from a main wall side of the main plate, in order to explain a securing structure of the stepping motor in the thin-sized flexible disk drive shown in FIG. 1.
Figure 15:
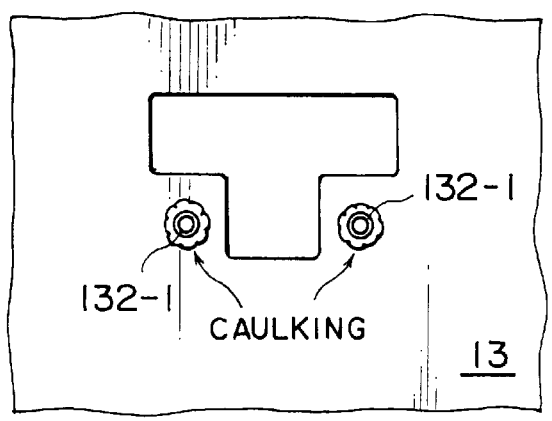
FIG. 15 is a plan view of the securing portion of the stepping motor shown in FIG. 14, and illustrating from a back-surface side of the main plate.
Figure 16:
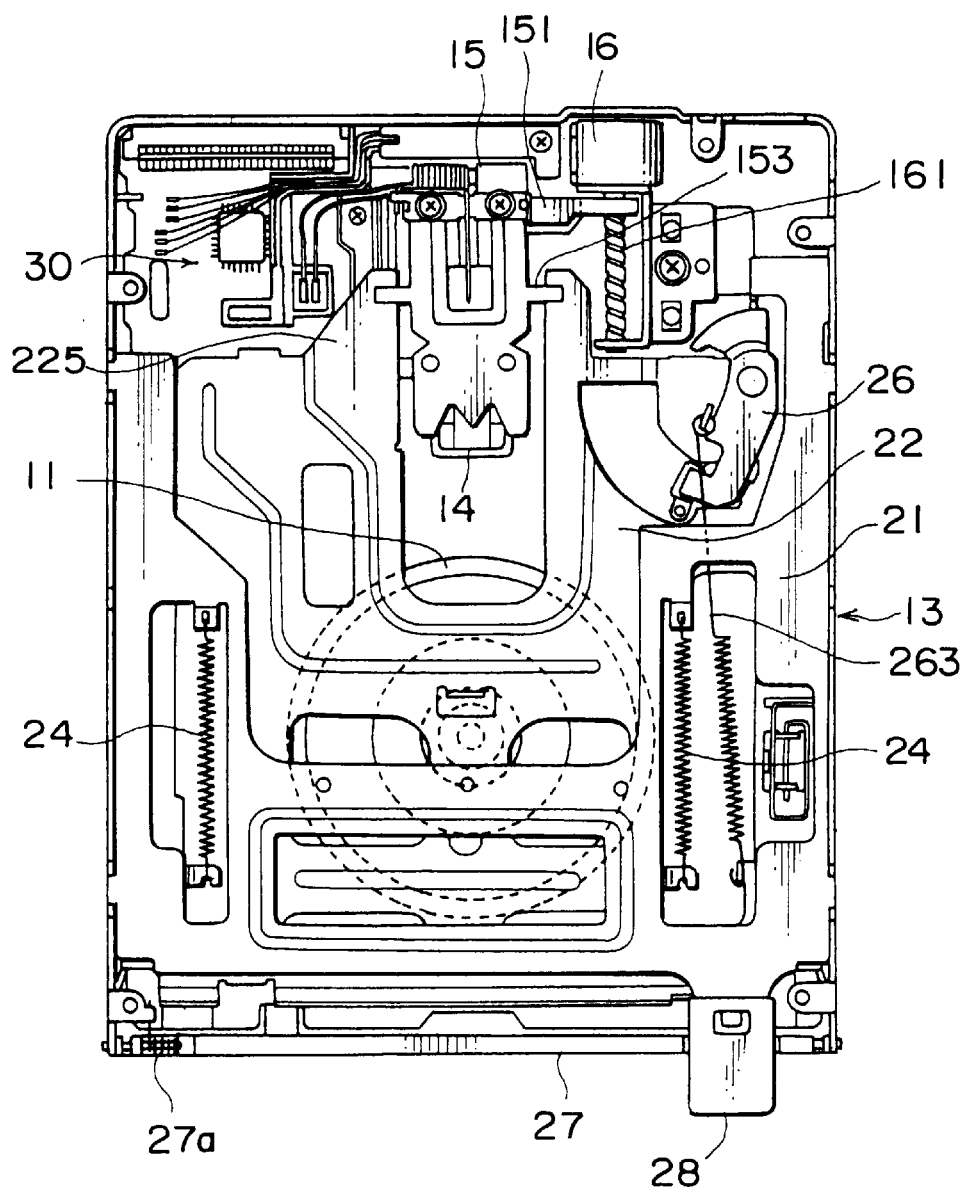
FIG. 16 is a view showing a thin-sized flexible disk drive according to an embodiment of the present invention with its top cover omitted.
Figure 17:
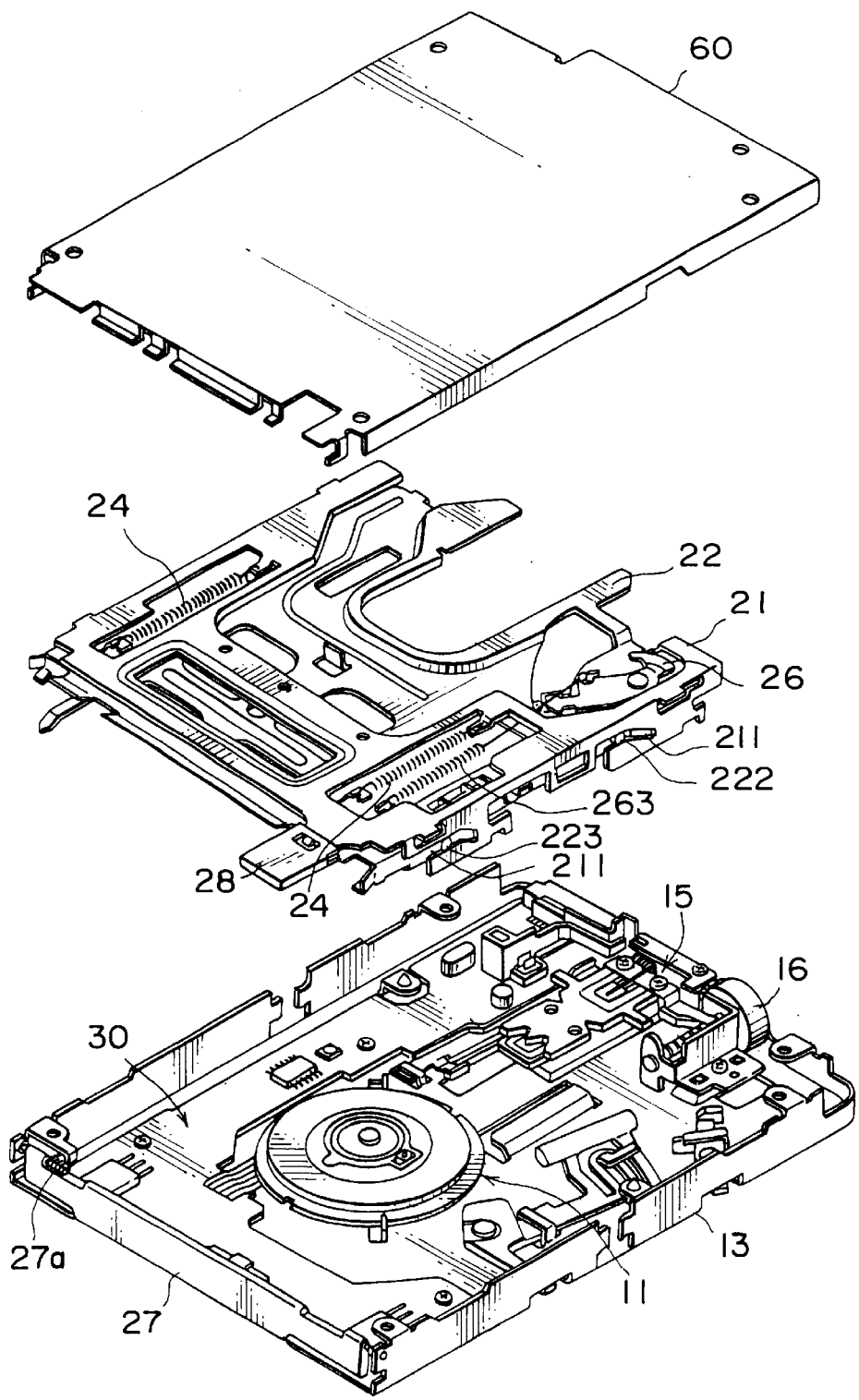
FIG. 17 is an exploded perspective view of the thin-sized flexible disk drive shown in FIG. 16.

A flexible disk drive according to a preferred embodiment of the present invention will be described below with reference to FIGS. 16 through 19. The flexible disk drive according to the preferred embodiment is particularly suited to a thin-sized flexible disk drive. FIG. 16 is a plan view of the thin-sized flexible disk drive (hereinafter referred to as to the flexible disk drive) according to the preferred embodiment with its top cover omitted. FIG. 17 is an exploded perspective view of the flexible disk drive shown in FIG. 16. The flexible disk drive has approximately the same structure as the flexible disk drive described previously with reference to FIGS. 1 through 13, except for characteristic portions of the present invention which will be described below. Accordingly, the same reference numerals are used to denote the same portions as those of the flexible disk drive shown in FIGS. 1 through 13.

The basic structure of the flexible disk drive will be described below with reference to FIGS. 16 and 17. The flexible disk drive is provided with a box-shaped main plate 13, a disk loading/ejecting mechanism accommodated in the main plate 13, a carriage assembly 15 for moving a magnetic head 14, and a stepping motor 16 for positioning and moving the carriage assembly 15. A front panel 27 for opening and closing a front opening of the main plate 13 is provided on the front end side of the main plate 13. The front panel 27 is turnable about its top end portion, and is urged to cover the front end opening of the main plate 13, by a spring 27a. An arm 151 of the carriage assembly 15 is engaged with a threaded portion of a rotating shaft 161 of the stepping motor 16. Side arms 153 of the carriage assembly 15 are positioned on a raised peripheral portion 225 of a disk holder 22.

The disk loading/ejecting mechanism is provided with an ejecting plate 21, and the disk holder 22 provided under the ejecting plate 21. A flexible disk is loaded in a space between the disk holder 22 and the main plate 13 above a disk table 11. The ejecting plate 21 and the disk holder 22 are stacked. The ejecting plate 21 is urged forward (downward as viewed in FIG. 16) by ejecting springs 24. An ejecting lever 26 is provided near the stepping motor 16. A spring 263 is provided between the ejecting lever 26 and the disk holder 22.

When the flexible disk is to be loaded into the flexible disk drive, the front edge of the flexible disk comes into abutment with one end of the ejecting lever 26, and causes the ejecting lever 26 to turn clockwise. After that, when the ejecting lever 26 reaches a predetermined position, the ejecting lever 26 engages with the disk holder 22 and stop its turning movement.

On the other hand, when the flexible disk is to be ejected, an ejecting button 28 is pressed to release the engagement between the ejecting lever 26 and the disk holder 22. Consequently, the ejecting lever 26 is turned counterclockwise by the returning force of the ejecting springs 24, and forces the flexible disk out of the flexible disk drive.

Referring to FIG. 17, the main plate 13 is provided with the disk table 11, the carriage assembly 15, the stepping motor 16 and a circuit board 30 on which electronic components are mounted. The top side of the flexible disk drive is covered with a top cover 60.

Figure 18:
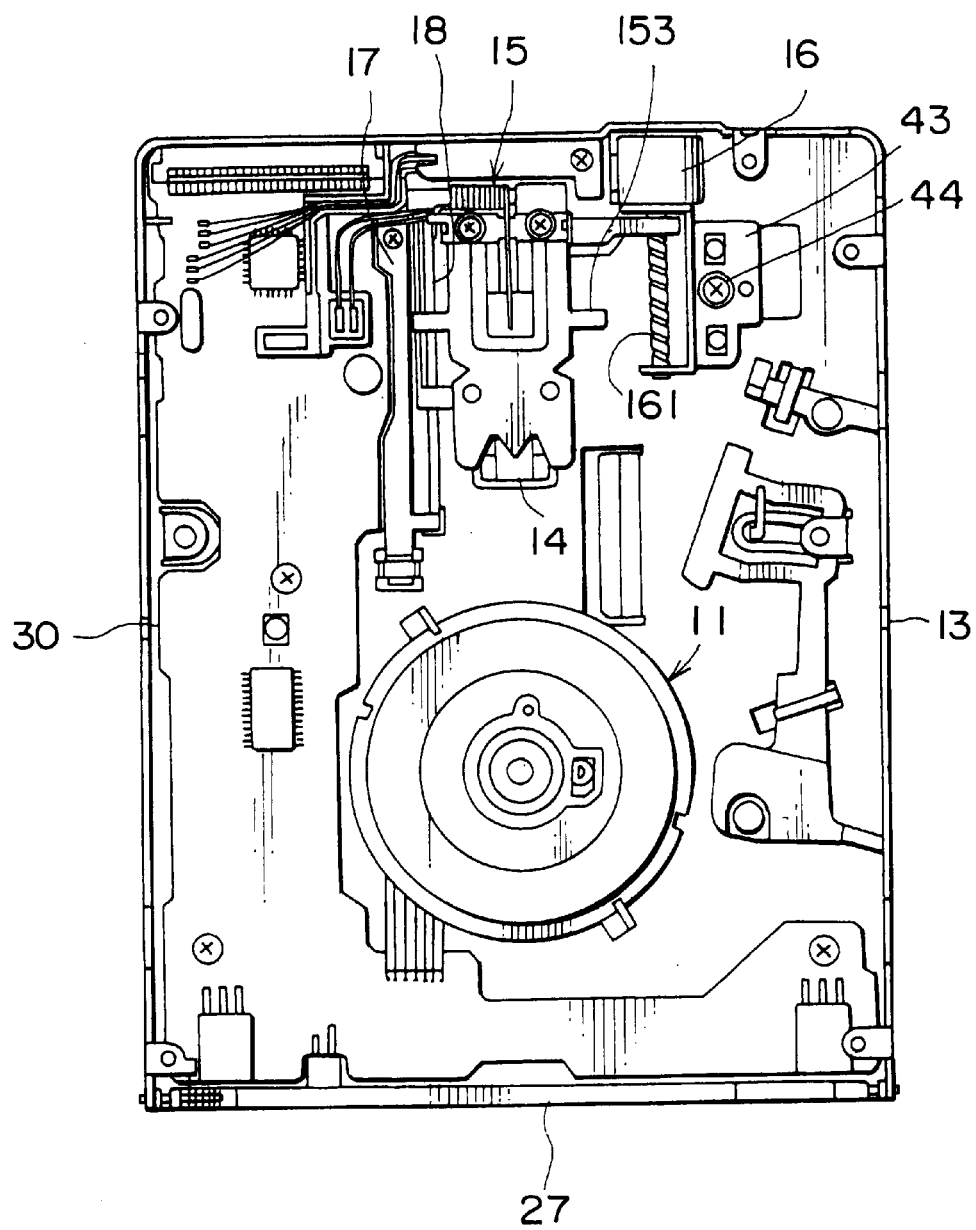
FIG. 18 is a plan view showing the thin-sized flexible disk drive shown in FIG. 16 with its disk loading/ejecting mechanism omitted.
Figure 19:
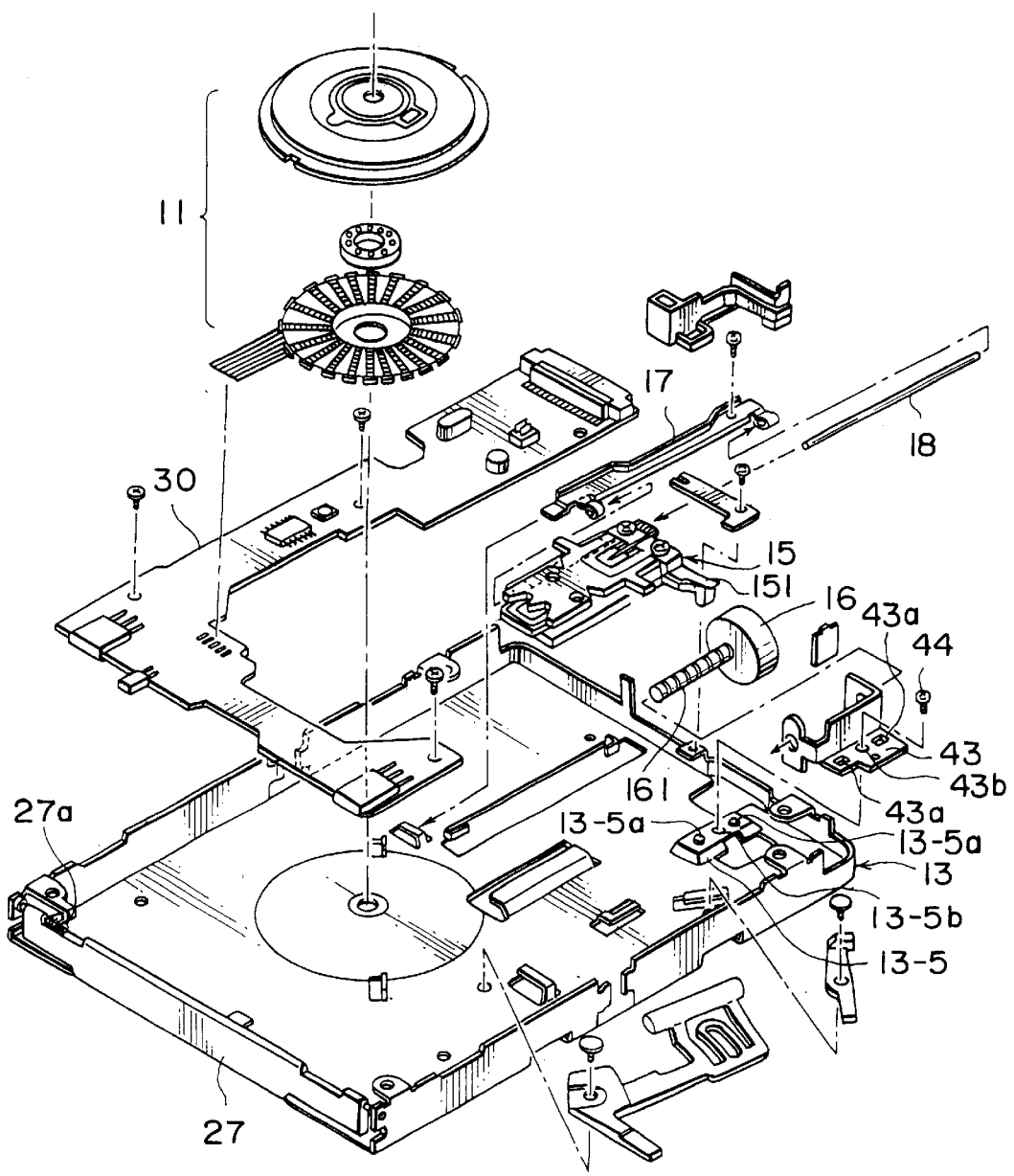
FIG. 19 is an exploded perspective view of the thin-sized flexible disk drive shown in FIG. 16 with its disk loading/ejecting mechanism omitted.

FIG. 18 is a plan view showing the flexible disk drive according to the preferred embodiment with the top cover 60 omitted. FIG. 19 is an exploded perspective view of the essential portion of the flexible disk drive shown in FIG. 18.

Referring to FIGS. 18 and 19, the flexible disk drive is provided with the main plate 13, the disk table 11 provided on the main wall of the main plate 13, and the circuit board 30 provided on the main wall of the main plate 13 at the periphery of the disk table 11. The carriage assembly 15 is provided on one side of the main wall of the main plate 13. One side of the carriage assembly 15 is guided by a guide bar 18. On the other side of the carriage assembly 15, the arm 151 is engaged with the threaded portion of the rotating shaft 161. The guide bar 18 is fixed to the main plate 13 by a metal member 17.

The securing structure of the stepping motor 16 which is a characteristic portion of the present invention is realized in the following manner. The stepping motor 16 is supported and fixed by a support metal member (support plate) 43 in a manner similar to that described previously in connection with FIG. 1. The support metal member 43 is secured to the main wall of the main plate 13 by one screw 44.

More specifically, the stepping motor 16 is disposed on a pedestal portion in such a manner as to be spaced apart from the main wall of the main plate 13. In the preferred embodiment, the pedestal portion is made of a pedestal 13-5 and the support metal member 43. The pedestal 13-5 is formed by projecting a portion of the main plate 13 from the reverse-surface (bottom-surface) side to the obverse-surface (top-surface) side. The support metal member 43 is screwed to the pedestal 13-5, and supports the body of the stepping motor 16 and rotatably supports the extending end of the rotating shaft 161 of the stepping motor 16. The pedestal 13-5 is provided with two positioning projections 13-5a formed to project from the obverse-surface side of the pedestal 13-5, and a screwing hole 13-5b for screwing the support metal member 43. As is apparent from FIG. 19, holes 43a and 43b are respectively provided in the support metal member 43 at locations corresponding to the projections 13-5a and the screwing hole 13-5b.

Incidentally, it is preferable that the pedestal 13-5 be formed by drawing and the projections 13-5a be formed by burring.

As described above, in the preferred embodiment, as a constituent element for disposing the stepping motor 16 apart from the main wall of the main plate 13, parts such as a bush is not used, and a part of the main plate 13 is utilized. In the preferred embodiment in particular, the projections 13-5a are provided at two locations, and the screwing hole 13-5b is provided between the two projections 13-5a. Accordingly, since the two projections 13-5a are respectively fitted in the two holes 43a, the horizontal rotation of the support metal member 43 is prevented. Accordingly, the support metal member 43 needs only to be screwed at one location. The support metal member 43 is accurately positioned by the two projections 13-5a. In addition, since the support metal member 43 needs only to be screwed at one location, the support metal member 43 does not at all become difficult to secure owing to dimensional error.

As is apparent from the foregoing description, in accordance with the flexible disk drive according to the present invention, parts such as a bush which would have so far been used is not needed as parts for supporting and fixing the stepping motor, and the support metal member needs only to be screwed at one location. Accordingly, it is possible to realize a cost reduction by reducing the required number of component parts by two bushes and one screw. In addition, since no caulking is needed, it is possible to realize a cost reduction owing to a reduction in the required number of assembling steps.

What is claimed is:

1. A flexible disk drive comprising:

a main plate;

a disk table for rotationally driving a flexible disk while holding the flexible disk;

a carriage assembly on which is mounted a magnetic head for recording and reproducing data on and from the flexible disk, the carriage assembly being movable relative to a radial direction of the flexible disk;

a stepping motor for driving the carriage assembly, the stepping motor being provided on the main plate; and a pedestal portion for positioning the stepping motor apart from a main wall of the main plate, wherein the pedestal portion comprises a pedestal projecting from the main plate, and a support plate screwed to the pedestal to support a body of the stepping motor and to rotatably support an extending end of a rotating shaft of the stepping motor, wherein the pedestal includes a plurality of positioning projections and a screwing hole for, screwing the support plate, and wherein the support plate comprises holes formed at positions respectively corresponding to the plurality of projections and the screwing hole.

2. A flexible disk drive according to claim 1, wherein the pedestal comprises a drawn portion of the main plate.

3. A flexible disk drive according to claim 2, wherein the projections comprise burred portions of the pedestal.

4. A flexible disk drive according to claim 3, wherein the projections comprise a first projection and a second projection, and the screwing hole is provided between the first and second projections.

5. A flexible disk drive according to claim 4, wherein the rotating shaft extends in the same direction as a traveling direction of the carriage assembly and has an external thread formed around its periphery, and wherein an arm which extends to the rotating shaft is provided on one of opposite sides of the carriage assembly and has an extending end engaged with a root portion of the external thread of the rotating shaft.

* * * * *